United States Patent
Chapiro et al.

[15] 3,666,693
[45] May 30, 1972

[54] SEQUENTIAL GRAFT COPOLYMERIZATION OF ACID AND BASIC MONOMERS ONTO A PERHALOGENATED OLEFIN POLYMER

[72] Inventors: Adolphe Chapiro; Anna-Maria Jendrychowska-Bonamour, both of Bellevue, France

[73] Assignee: Centre National de la Recherche Scientifique, Paris, France

[22] Filed: Feb. 17, 1969

[21] Appl. No.: 799,996

[52] U.S. Cl. ....................260/2.5 R, 204/159.17, 210/24, 210/321, 210/500, 260/2.5 M, 260/884
[51] Int. Cl. .........................................................C08f 15/40
[58] Field of Search ..........................260/884, 2.5 R, 29.6 H; 204/159.17

[56] References Cited

FOREIGN PATENTS OR APPLICATIONS 1,043,008  9/1966  Great Britain..........................260/884

OTHER PUBLICATIONS

Bex, et al., " J. Polymer Science" : Part C, No. 22, pp. 493–499 (1968)
Chapiro, et al., " European Polymer J.," Vol. 1, p. 196, (1965)

Primary Examiner—Murray Tillman
Assistant Examiner—John Seibert
Attorney—Burgess, Dinklage & Sprung

[57] ABSTRACT

Improved process of producing semipermeable membranes by graft copolymerization, wherein a perhalogenated olefin polymer substrate has grafted thereonto copolymers having acid and basic groups respectively, where the grafting of acid and basic monomers is carried out sequentially, where the first grafted group is neutralized before the second group is grafted onto the substrate, and where substantially all pendant acid and basic functions are neutralized after grafting has been completed.

6 Claims, 1 Drawing Figure

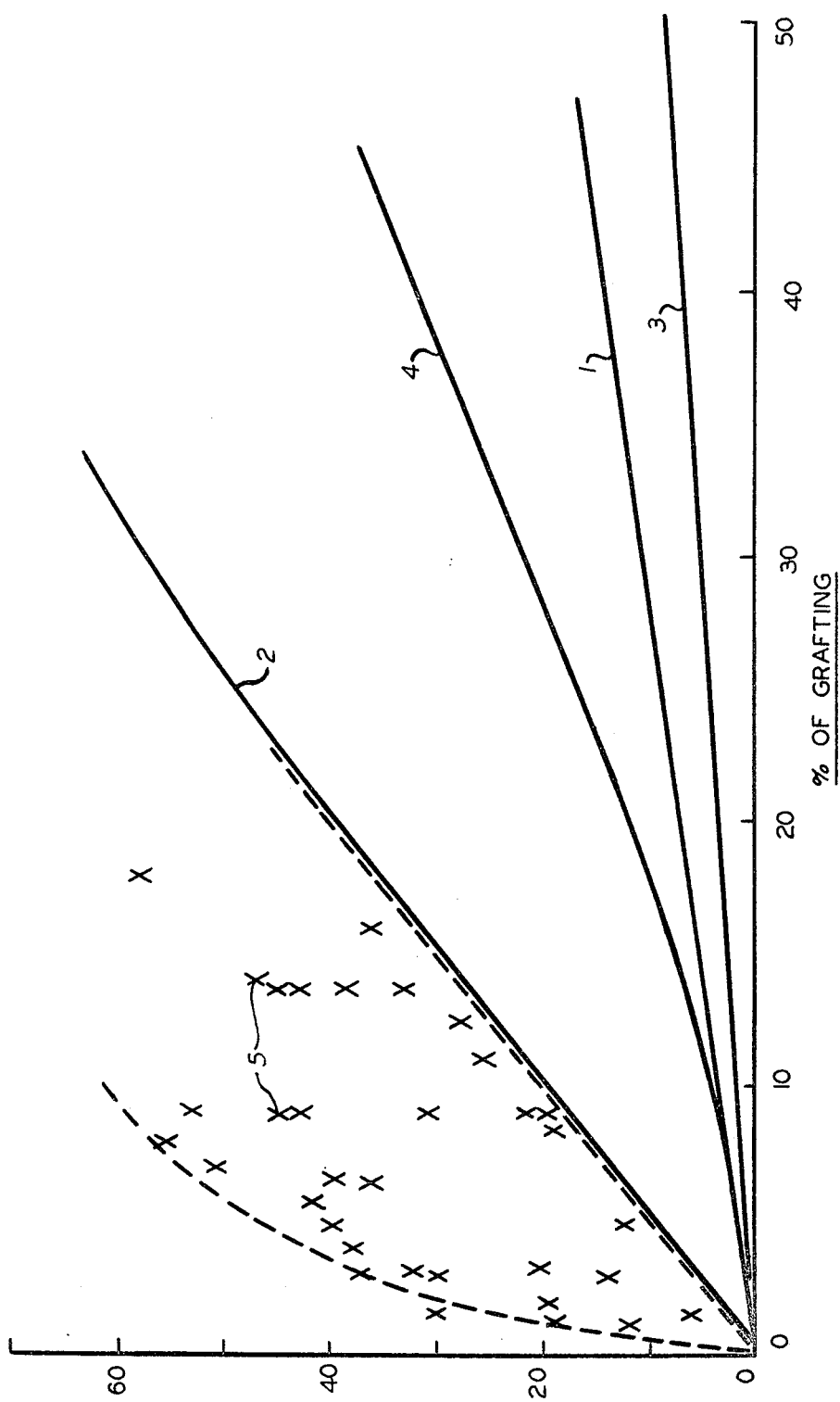

SEQUENTIAL GRAFT COPOLYMERIZATION OF ACID AND BASIC MONOMERS ONTO A PERHALOGENATED OLEFIN POLYMER

This invention relates to the production of graft polymers. It more particularly refers to a novel process of producing graft copolymers which produces products which are unusually good semipermeable membranes.

Semipermeable membranes are known. It is known to produce semipermeable membranes by graft copolymerization of certain types of comonomers onto a preformed perhalogenated olefin polymer backbone. It is known that good semipermeable membranes can be made by graft copolymerization of carboxyl containing unsaturated monomers onto a preformed perhalogenated olefin polymer. This process has been reported in French patent 1,371,843, filed June 25, 1963.

In the above referred to French patent 1,371,843, it has been proposed to produce semipermeable membranes by grafting a carboxylic acid containing monomer onto a preformed film or sheet of perhalogenated olefin polymer with the aid of high energy ionizing radiation. This reference has taught that forming a graft copolymer film should be carried out in an aqueous solution, in the presence of an inhibitor for the homopolymerization of the carboxyl containing monomer.

The products of this process are membranes which are highly resistant to corrosive agents and to elevated temperatures. This chemical and thermal resistance is due principally to the perhalogenated olefin polymer which itself has an inherently high resistance of both the thermal and chemical type. Unfortunately, these graft copolymers show a less than satisfactory degree of swelling in water.

The same patent has noted that the water swelling of the graft copolymer is much improved if the carboxyl groups on the graft copolymer are neutralized, e.g. with sodium or potassium hydroxide. In fact, it has been shown that such neutralization increases the degree of water swelling by as much as five to six times.

These data have previously been reported in European Polymer Journal (1965) Volume I, pg. 198 (Pergamon Press LTD) by A. Chapiro and P. Seidler.

It is also known to produce good semipermeable membranes by graft copolymerizing copolymerizable basic monomers onto a perhalogenated olefin polymer backbone. This process in reported for instance in Journal of Polymer Science, Part C, 1968, Vol. 22, pg. 493.

It has been determined that the graft copolymers of the type referred to herein having basic groups pendant therefrom has an even lower water swellability than has the above-referred to acid containing copolymer. However, it has also been discovered that neutralization of the basic groups increases the water swellability of the copolymer by up to about three times or more. These data have been published as part of the "Symposium International de Chimie Macromoleculaire" held at Brussels, Belgium, during June 12 to 16, 1967. (Journal of Polymer Science, Interscience New York, Part C, 1968, Vol. 22, pg. 493).

Whereas these known processes produce semipermeable membranes which have good physical properties, it is always desirable to improve upon the known products and/or the known processes.

It is therefore an object of this invention to provide a novel graft copolymer.

It is another object to provide a novel process of producing graft copolymer.

It is a further object of this invention to provide an improved semipermeable membrane.

Other and additional objects of this invention will become apparent from a consideration of this entire specification including the claims and the drawing hereof.

In accord with and fulfilling these objects, one aspect of this invention resides in a novel graft copolymer of a preformed perhalogenated olefin polymer having copolymer units of both carboxyl and basic functionality grafted thereonto, wherein both of said functional groups are substantially neutralized.

It has been discovered that perhalogenated olefin polymers having grafted thereonto both acid and basic functionality, wherein the acid and the basic functionality are both substantially neutralized, have vastly improved water swellability as compared with the best prior art graft copolymers having the same proportion of grafted comonomer thereon.

It has been discovered that, if acid organic groups and basic organic groups are incorporated together into the perhalogenated polyolefin membrane, the rate of swelling of this "mixed" membrane is superior to the rates observed in the case of the "simple" membranes containing naught but acid organic groups, an outcome which is entirely unexpected.

Understanding of this invention will be aided by reference to the accompanying drawing which is a series of curves showing water swellability for various types of copolymers plotted against proportions of grafted comonomers.

Referring now to this drawing, curve 1 is for a polytetrafluoroethylene polymer substrate having acrylic acid graft copolymerized thereonto. Curve 2 shows this same graft copolymer with neutralization of the product carboxyl groups. Curve 3 shows a polytetrafluoroethylene polymer substrate having 4-vinyl pyridine grafted thereonto. Curve 4 shows this same graft copolymer with the basic groups pendant therefrom neutralized. The data points 5 are for polytetrafluoroethylene polymer substrate having grafted thereonto neutralized, mixed acid and basic comonomers. The acid was acrylic acid and the base was 4-vinyl pyridine. It is apparent that they are all superior to those corresponding to the "simple" membranes.

The acid organic or "carboxylic" groups are each derived from a monomeric acid that is polymerizable alone (acrylic acid, methacrylic acid, . . . ) or from an acid (maleic acid . . . ) that is polymerizable in mixture with another monomer.

The basic organic groups are derived each from a polymerizable vinylic monomer of the pyridine type (vinyl-4-pyridine, vinyl-2-pyridine, methylvinyl pyridines, . . . ) or of the amine type (para-aminostyrene, orthoaminostyrene, aminovinyltoluene . . . ).

To incorporate these groups into the perhalogenated polyolefin sheet, one might think that it would suffice to graft onto this sheet a mixture of the acid and basic monomers selected, or to graft these two monomers on successively.

Experience, however, shows that these methods do not give satisfaction, because as soon as the acid (or basic) monomer is in the presence of the basic (or acid) monomer, a reaction takes place and a salt polymer is formed, which is not chemically bonded to the perhalogenated polyolefin, and which is easily extracted from the latter by washing.

This is why, according to the invention, the acid groups and the basic groups are incorporated successively into the sheet, and care is taken to separate these two stages of incorporation by a phase in which the incorporated groups are neutralized.

Each of the incorporation stages in question is performed in the known manner cited above.

The intermediate neutralization is advantageously accomplished by washing with an excess of a mineral base (e.g., sodium or potassium hydroxide) if the groups to be neutralized are acid, or with an excess of mineral acid (e.g., hydrochloric acid or sulfuric acid) if the groups to be neutralized are basic.

It is advantageous to neutralize in the same manner the groups incorporated during the second stage, if it is desired to obtain a maximum rate of swelling by water for the membrane being prepared.

From this high rate of swelling by water in the mixed membranes, it appears that valuable properties can be obtained with these membranes, such as low electrical resistance or high permeability to water for lower total contents of active groups than in the simple acid or basic membranes. In other words, it is possible to obtain membranes having a given permeability to water or a given electrical resistance with a larger content of perhalogenated polyolefin, which endows these membranes with better resistance to corrosion.

The graft copolymer sheets according to this invention are useful as semipermeable membranes. As such they are formed into membranes in the manner known in the art and are useful in electrodialysis, reverse osmosis, electrolysis cells, fuel cells, desalination devices and the like.

This invention will be illustrated by the following examples which are in no way limiting on the scope hereof.

EXAMPLE 1

A polytetrafluoroethylene (PTFE) film of 0.1 mm thickness and weighing 0.9852 gram was sealed under vacuum in a glass flask containing an aqueous solution of 50 percent acrylic acid, containing 0.25 percent of Mohr's salt (ferrous ammonium sulfate). This flask was irradiated with the gamma rays from a cobalt-60 source at an intensity of 240 rads per minute. After 38 hours of irradiation, the film was removed from the flask, washed in water and dried. Its weight was 1.349 g.

This film was washed for 24 hours with a 0.1 normal potassium hydroxide solution. After drying, its weight was 1.532 g. Two fragments of this film were sealed under a vacuum in flasks containing an 80 percent aqueous solution of vinyl-4-pyridine. Each flask was subjected to different doses of gamma rays at an intensity of 29 rads per minute. Then the films were washed in water, and then in a solution of 10 normal hydrochloric acid solution, and finally dried. The results are summarized in Table I:

TABLE I

| Wt. of film after 1st graft and neutralization | Dose in second graft (in rads) | Wt. of film after 2nd graft and neutralization | % swelling of film in water (i.e., g. of water per 100 g. of dry film) |
| --- | --- | --- | --- |
| 0.0760 | 38,900 | 0.0735 | 25.9 |
| 0.0705 | 86,400 | 0.0790 | 39.8 |

A PTFE film of 0.05 mm thickness and weighing 1.0070 g. was sealed in vacuum in a glass flask containing on 80 percent aqueous solution of vinyl-4-pyridine. This flask was subjected to gamma rays at 36 rads per minute. After a total dose of 94,000 rads, the film weighed, after drying, 1,1475 g., which corresponds to an amount of grafting of about 14 percent.

Several fragments of this film were treated for 24 hours with a 0.1 N solution of hydrochloric acid, and then irradiated in vacuo with gamma rays at 27.5 rads per minute in a 50 percent aqueous solution of acrylic acid containing 0.25 percent by weight of Mohr's salt. The films were then washed in water and then in a 0.1 N solution of potassium hydroxide. The results are summarized in Table II:

TABLE II

| Weight of film after 1st graft and neutralization | Dose in second graft (in rads) | Weight of film after 2nd graft and neutralization | % Swelling of film in water |
| --- | --- | --- | --- |
| 0.0365 | 26,600 | 0.0325 | 6.15 |
| 0.0385 | 68,500 | 0.0345 | 14.5 |
| 0.0395 | 149,000 | 0.0375 | 21.3 |
| 0.0445 | 192,000 | 0.0465 | 24.7 |

EXAMPLE 3

A PTFE film 0.05 mm thick, weighing 1.1030 g, was grafted with vinyl-4-pyridine as in Example 2, but with a total dose of 119,000 rads instead of 94,000. It weighed 1.5965 g. after drying, which corresponds to an amount of grafting of about 45 percent (instead of 14).

Several fragments of this film were neutralized with hydrochloric acid and then treated with acrylic acid as in Example 2. The results are summarized in Table III:

TABLE III

| Weight of film after 1st graft and neutralization | Dose in 2nd graft (in rads) | Weight of film after 2nd graft and neutralization | Swelling of film in water in percent |
| --- | --- | --- | --- |
| 0.0650 | 41,000 | 0.0490 | 53.1 |
| 0.0565 | 78,000 | 0.0445 | 47.1 |
| 0.0535 | 108,000 | 0.0420 | 43.0 |
| 0.0615 | 183,000 | 0.0500 | 58.0 |

It is to be noted that, in each of the three examples above, cases are found in which the weight of the film diminished after the second grafting. This effect presumably corresponds to some extractions of the polymer.

Nevertheless, the swelling of this film in water is very high — higher than that of membranes containing only acrylic acid or vinyl-4-pyridine. Its permeability to water is likewise higher, whereas its electrical resistance is lower.

All the membranes thus prepared have very good resistance to strong bases and strong acids.

As it is self-evident, and as it appears also from the foregoing, the invention is by no means limited to those of its modes of application and embodiment which have been more particularly contemplated above; on the contrary, it includes all variants, particularly those in which the intermediate and/or final neutralizations would be accomplished by means of organic rather than mineral acids or bases.

It should be noted that the subject matter of this application is particularly directed toward a novel process of producing polymeric films which are extremely useful as semipermeable membranes. This novel process resides in the combination of two previously known processes, which combination produces a product which has synergistic properties with respect to the products of these prior art processes. This synergism is obtained by first graft-polymerizing a carboxylic acid or organic base containing copolymerizable monomer onto a perhalogenated olefin preformed polymer (which process is per se known in the art), neutralizing the resultant graft copolymer through treatment with an aqueous solution of an appropriate neutralizing agent (which process is per se known in the prior art), further graft-copolymerizing the other of the polymerizable carboxylic acid or organic base onto the neutralized graft copolymer referred to above, and then neutralizing the second graft copolymerized material.

Operation of the process according to this invention results in a multi-graft copolymer having neutralized acid and base groups pending therefrom which has remarkably and unexpectedly higher swellability in water than the prior art neutralized acid or base graft copolymers having the same substrate. This swellability is directly related to the water permeability of the polymer and therefore is directly related to the efficiency of using this polymer as a semipermeable membrane. In this regard it should be noted that when preparing membranes according to this invention, a membrane can be prepared having equivalent water swellability to that available in prior art membranes having the same preformed polymer substrate, but wherein the final graft copolymer has a higher relative proportion of the preformed polymer substrate and therefore more of the physical and chemical characteristcs of this preformed polymer substrate than was available in the prior art. Conversely, a multi-graft copolymer can be produced according to this invention having substantially the same physical and chemical properties as the graft copolymers in the prior art, but having a significantly higher water swellability than is available with polymers of the prior art.

What is claimed is:

1. A graft copolymer having a perhalogenated olefin polymer substrate and graft copolymerized thereonto substantially neutralized pendant carboxyl group containing material selected from the group consisting of acrylic acid, methacrylic acid and maleic acid and substantially neutralized pendant basic group containing material selected from the group consisting of 4-vinyl pyridine, 2-vinyl pyridine, methyl vinyl pyridine, p-amino styrene, o-amino styrene and amino vinyl toluene.

2. A graft copolymer as claimed in claim 1, wherein said substrate is polytetrafluoroethylene.

3. Process of producing graft copolymers comprising contacting a perhalogenated olefin polymer with one member of the group consisting of olefinically unsaturated copolymerizable carboxylic acids selected from the group consisting of arcylic acid, methacrylic acid and maleic acid and olefinically unsaturated copolymerizable organic bases selected from the group consisting of 4-vinyl pyridine, 2-vinyl pyridine, methyl vinyl pyridine, p-amino styrene, o-amino styrene and amino vinyl toluene; subjecting such to ionizing radiation in an amount and for a time sufficient to graft copolymerize said group member onto said substrate; neutralizing the functionality of said graft copolymer, contacting the neutralized graft copolymer with the other member of said group; subjecting such to ionizing radiation in an amount and for a time sufficient to graft copolymerize said other member onto said graft copolymerized substrate: and neutralizing the functionality of said other graft copolymerized member.

4. Process claimed in claim 3 wherein said acid is first graft copolymerized and said acid is neutralized with a base.

5. Process claimed in claim 3 wherein said base is first graft copolymerized and said base is neutralized with an acid.

6. A semipermeable membrane made of the graft copolymer claimed in claim 1.

* * * * *

UNITED STATES PATENT OFFICE
CERTIFICATE OF CORRECTION

Patent No. 3,666,693    Dated May 30, 1972

Inventor(s) Adolphe Chapiro et al

It is certified that error appears in the above-identified patent and that said Letters Patent are hereby corrected as shown below:

The French Priority application PV 144,211 filed March 18, 1968, claimed in the oath and forwarded with letter of March 13, 1972 has not been included.

<u>Col. 3, line 38</u>

"EXAMPLE 2" has been omitted.

Signed and sealed this 2nd day of January 1973.

(SEAL)
Attest:

EDWARD M. FLETCHER, JR.
Attesting Officer

ROBERT GOTTSCHALK
Commissioner of Patents